US012617425B2

(12) United States Patent
Edling et al.

(10) Patent No.: US 12,617,425 B2
(45) Date of Patent: May 5, 2026

(54) METHOD FOR OPERATING AN ASSISTANCE SYSTEM, AND ASSISTANCE SYSTEM

(71) Applicant: AUMOVIO Autonomous Mobility Germany GmbH, Ingolstadt (DE)

(72) Inventors: Frank Edling, Schwalbach (DE); Sebastien Reisinger, Hamm am Rhein (DE); Henrik Matschat, Frankfurt (DE)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 97 days.

(21) Appl. No.: 18/554,606

(22) PCT Filed: Mar. 18, 2022

(86) PCT No.: PCT/DE2022/200046
§ 371 (c)(1),
(2) Date: Oct. 9, 2023

(87) PCT Pub. No.: WO2022/214148
PCT Pub. Date: Oct. 13, 2022

(65) Prior Publication Data
US 2024/0199072 A1 Jun. 20, 2024

(30) Foreign Application Priority Data
Apr. 9, 2021 (DE) ..................... 10 2021 203 541.8

(51) Int. Cl.
*B60W 60/00* (2020.01)
*B60W 30/12* (2020.01)
(Continued)

(52) U.S. Cl.
CPC .......... *B60W 60/001* (2020.02); *B60W 30/12* (2013.01); *G01S 13/862* (2013.01);
(Continued)

(58) Field of Classification Search
CPC .... G08G 1/001; B60W 60/001; B60W 30/01; B60W 50/00; G01S 15/85; G01S 17/86; G01S 13/86; G01S 13/865; G01S 13/867
See application file for complete search history.

(56) References Cited

U.S. PATENT DOCUMENTS

2016/0110932 A1 4/2016 Klein et al.
2018/0345990 A1* 12/2018 Fey ........................... B60R 1/27
(Continued)

FOREIGN PATENT DOCUMENTS

DE 102014220925 A1 4/2016
DE 102017007958 A1 1/2018
(Continued)

OTHER PUBLICATIONS

German Search Report dated Dec. 2, 2021 for the priority German Patent Application No. 10 2021 204 239.2.
(Continued)

*Primary Examiner* — Tan Q Nguyen

(57) ABSTRACT

The invention relates to a method for operating an assistance system for a vehicle, including a control device for controlling the assistance system, multiple sensors for capturing the environment, a first sensor set which includes at least one sensor of the sensors for capturing the environment, and a second sensor set which includes at least one sensor of the sensors for capturing the environment. The sensor signals of the first sensor set are enlisted in order to create an environmental model, and driving functions of the assistance system are carried out on the basis of the environmental model. A sensor signal path switch is provided which switches the sensor signals of the second sensor set either via a main path to the signal processing of the environmental model or via a safety path to the signal processing of a plausibility check of the planned trajectory.

9 Claims, 7 Drawing Sheets

(51) Int. Cl.

| | | |
|---|---|---|
| *G01S 13/86* | (2006.01) |
| *G01S 15/86* | (2020.01) |
| *G01S 15/87* | (2006.01) |
| *G01S 17/86* | (2020.01) |
| *G06V 20/56* | (2022.01) |

(52) U.S. Cl.

CPC .......... *G01S 13/865* (2013.01); *G01S 13/867* (2013.01); *G01S 15/86* (2020.01); *G01S 15/87* (2013.01); *G01S 17/86* (2020.01); *G06V 20/588* (2022.01)

(56) References Cited

U.S. PATENT DOCUMENTS

| | | | | |
|---|---|---|---|---|
| 2019/0146489 | A1* | 5/2019 | Zaizen ............. | B60W 60/0053 |
| | | | | 701/42 |
| 2020/0307640 | A1 | 10/2020 | Tsuji | |
| 2021/0114567 | A1 | 4/2021 | Rebholz-Goldmann et al. | |
| 2021/0146939 | A1 | 5/2021 | Sari | |
| 2022/0144297 | A1* | 5/2022 | Seitz ...................... | B60K 35/81 |
| 2024/0132100 | A1* | 4/2024 | Knievel ................. | G08G 1/167 |

FOREIGN PATENT DOCUMENTS

| | | | | |
|---|---|---|---|---|
| DE | 102017210156 | A1 | 12/2018 | |
| DE | 102017007957 | A1 | 3/2019 | |
| DE | 102018204598 | A1 | 10/2019 | |
| DE | 102018130815 | A1 | 6/2020 | |
| DE | 102019210339 | A1* | 1/2021 | .......... B60W 50/029 |
| DE | 102019125401 | A1 | 3/2021 | |
| JP | 2017182563 | A | 10/2017 | |
| JP | 2020166667 | A | 10/2020 | |

OTHER PUBLICATIONS

The International Search Report and the Written Opinion of the International Searching Authority mailed on Jun. 28, 2022 for the counterpart PCT Application No. PCT/DE2022/200046 from which this application claims priority.

Notice of Refusal dated Jun. 20, 2024 for the counterpart Japanese Patent Application No. 2023-553702 and machine translation of same.

* cited by examiner

METHOD FOR OPERATING AN ASSISTANCE SYSTEM, AND ASSISTANCE SYSTEM

CROSS-REFERENCE TO RELATED APPLICATIONS

The present application is a National Stage Application under 35 U.S.C. § 371 of International Patent Application No. PCT/DE2022/200046 filed on Mar. 18, 2022, and claims priority from German Patent Application No. 10 2021 203 541.8 filed on Apr. 9, 2021, in the German Patent and Trademark Office, the disclosures of which are herein incorporated by reference in their entireties.

TECHNICAL FIELD

The present disclosure relates to a method for operating an assistance system according to claim 1 as well as an assistance system. Furthermore, the present disclosure relates to a vehicle which has an assistance system according to the present disclosure, as well as a computer program for carrying out the method and a transportable computer-readable storage medium on which the computer program for carrying out the method is stored.

BACKGROUND

Generic vehicles such as, e.g., passenger cars, trucks or motorcycles, are increasingly being equipped with assistance systems or driver assistance systems which, with the aid of sensor systems, can capture the surroundings, recognize traffic situations and assist the driver, e.g., by a braking or steering intervention or by outputting a visual, haptic or acoustic warning. Radar sensors, lidar sensors, camera sensors, ultrasonic sensors or the like are regularly deployed as sensor systems for capturing the surroundings. Conclusions can subsequently be drawn about the surroundings from the sensor data ascertained by the sensors, with which, e.g., a so-called environmental model can also be generated. Based thereon, instructions for warning/informing the driver or for regulated steering, braking and acceleration can subsequently be output. Assistance functions which process the sensor and environmental data can avoid, e.g., accidents with other road users or can facilitate complicated driving maneuvers by assisting with, or even completely taking over (in a partially or fully automated manner), the driving task or the vehicle control. For example, the vehicle can adjust the speed and the manner in which the vehicle follows a vehicle driving ahead, e.g., by means of an Emergency Brake Assist (EBA), Automatic Emergency Brake (AEB), Adaptive Cruise Control (ACC) or a steering assistant to keep the vehicle in the lane (LKA, Lane Keep Assist). There are assistance functions such as EBA which, as a general rule, are automatically activated or activate automatic interventions, or assistance functions which the driver activates, as a general rule, such as, e.g., ACC.

As a general rule, generic assistance systems have a static architecture in accordance with the "Sense-Plan-Act" principle, in which the various sensors feed data into a central control unit (ECU—Electric Control Unit) which then creates a central "environmental model," The "environmental model" is then connected to a "driving function" (maneuver planning, trajectory planning) and then feeds the required data into a motion control module on the central control unit. The output of the central control unit is then connected to various actuators (braking system, steering system, drive train) in order to carry out the driving function. The sensor architecture is static. However, if redundancy is required, a set of sensors (a so-called sensor set) is used for the so-called "main path" of the control function (e.g., a first camera which is enlisted for keeping the vehicle in the lane). By way of contrast, a second set of sensors (e.g., a second camera for recognizing errors in the lane estimation of the first camera) is used for a safety path (redundancy of the main path) in order to recognize errors and to bring the system into a safe state.

Commands which indicate a "freedom from faults" for the main path of a driving function and a safety function are known from ISO26262 "Road vehicles—Functional safety". For example, a camera which is deployed to generate or detect lanes for a driving function, e.g., within the framework of Lane Keep Assist, must not be used for checking the correctness of the lane created. Since the initial lane generation could be erroneous, it would not be expedient to carry out the validation with the same lane information. Consequently, the standard approach includes constructing completely redundant units: e.g., a safety path with a separate camera in addition to the main path. However, the redundancy concept by means of separate paths is "cost-intensive" since, as a general rule, a second sensor set is necessary, as a result of which separate costs are, in addition, incurred for acquisition and installation.

An apparatus for actuating a vehicle module is known from DE 10 2017 210 156 A1, which has a safety processor with at least one information interface at an input of the safety processor and a control interface at an output of the safety processor, wherein the safety processor has a first core, a second core and a third core. The first core is designed to conduct a first plausibility check of at least one first item of information, which is routed via the information interface to the safety processor, with at least one second item of information which is routed via the information interface to the safety processor; the second core is designed to conduct a second plausibility check of the first item of information with the second item of information and the third core is designed to conduct a comparison of a result of the first plausibility check conducted on the first core, which is forwarded to the third core, with a result of the second plausibility check conducted on the second core, which is forwarded to the third core, and to forward the information for which a plausibility was established in the first plausibility check and in the second plausibility check to the control interface, wherein the vehicle module can be actuated with the information which is established to be plausible via the control interface.

Furthermore, DE 10 2017 007 958 A1 discloses a driver assistance system for a vehicle, having a first monitoring system for monitoring the lateral surroundings of the vehicle with a first monitoring area, a second monitoring system, which differs from the first monitoring system, for monitoring the lateral surroundings of the vehicle with a second monitoring area, which differs from the first monitoring area, and having a control device which is adapted to evaluate the first data of the first monitoring system and the second data of the second monitoring system. It is provided that the control device is adapted in order to form a common representation of a geometric overlap of the first monitoring area and the second monitoring area from the first data of the first monitoring system and the second data of the second monitoring system.

Proceeding from the prior art, a problem is to make available a method by means of which a generic assistance system can be improved in a simple and inexpensive manner in such a way that the disadvantages from the prior art are overcome, wherein sufficient redundancy is provided for safety-critical driving functions or applications.

SUMMARY

The aforementioned problem is addressed by the entire teaching of claim 1 as well as the alternative, independent claims. Expedient configurations of the present disclosure are claimed in the subclaims.

The method according to the present disclosure for operating an assistance system for a vehicle includes a control device for controlling the assistance system, multiple sensors for capturing the environment, a first sensor set which comprises at least one sensor of the sensors for capturing the environment, and a second sensor set which comprises at least one sensor of the sensors for capturing the environment, wherein the sensor signals of the first sensor set are enlisted in order to create an environmental model, and trajectory planning and/or driving functions of the assistance system is/are carried out on the basis of the environmental model, and a sensor signal path switch is provided, which routes the sensor signals of the second sensor set either via a main path to the signal processing of the environmental model or via a safety path to the signal processing of a plausibility check of the planned trajectory.

This results in the advantages that in the case of a (partially) automated vehicle, sufficient redundancy is ensured in the signal processing chain depending on the activated function and application, in order to guarantee safe driving and fail-safe operation, wherein no significant additional costs are incurred for sensors and the installation, wiring or maintenance thereof.

A mode manager may be expediently provided, which is set up to recognize assistance functions and assistance functions to be automatically activated, and which can establish the necessity of whether a safety path is required or not on the basis of the recognized assistance functions.

The sensor signal path switch may switch the sensor signals on the basis of the establishment of the mode manager.

In alternative, independent claims or subclaims, the present disclosure is directed to a method for operating an assistance system for a vehicle, including the following method steps of:

determining an assistance function to be carried out, determining an assistance function to be automatically activated, establishing the necessity of constructing a redundant sensor path (=safety path) for the activated functions, switching off the signals of the sensors of the redundant path for the main path of the system if the redundant path is necessary, activating the redundant path in order to check the outputs of the main path of the system if the safety path is necessary, and deactivating the functions which are not possible without the sensors (i.e., of the second sensor set) of the redundant path.

Furthermore, the necessity of constructing a redundant sensor path for the activated functions can be established on the basis of the activated function (e.g., hands-off, Traffic Jam Companion) and the current vehicle state (stationary, in motion, vehicle speed).

The necessity of constructing a redundant sensor path for the activated functions may be established on the basis of the driver state (hands-on or hands-off).

The redundant path may, furthermore, be used in order to check the plausibility of the output trajectory of the main path, which is to be driven, against an alternative road model of the redundant path.

The redundant path may be expediently used in order to bring about the driver handover and the minimum-risk state (in particular braking to a standstill on the last valid path) in the event of the trajectory of the main path being implausible.

The road model of the redundant path may, furthermore, be created on the basis of detected lane markings of a redundant camera (e.g., surround-view which is otherwise only used for parking).

Furthermore, the present disclosure also includes a computer program with program code for carrying out the method according to the present disclosure when the computer program is run on a computer or another programmable data processor known from the prior art. Accordingly, the method may also be configured as a purely computer-implemented method, wherein the term "computer-implemented method" within the meaning of the present disclosure describes process planning or a procedure which is realized or carried out on the basis of a data processor. The data processor such as, e.g., a computer, a computer network or another programmable apparatus known from the prior art (e.g., a data processing apparatus comprising a processor, microcontroller or the like such as, e.g., a control device) may process data by means of programmable calculation specifications.

In addition, the present disclosure includes a computer-readable storage medium which includes instructions which prompt the computer on which they are run to carry out a method.

Furthermore, the present disclosure also includes a vehicle which includes an assistance system according to the present disclosure, a computer program according to the present disclosure or a computer-readable storage medium according to the present disclosure.

Within the meaning of the present disclosure, ultrasonic sensors which are deployed, e.g., for automated parking, avoiding collisions at low speed, recognizing the clearance for ACC "auto go," are subsumed under the term "USS."

Furthermore, short-range radars which are deployed, e.g., for avoiding side impacts in the assisted mode or for improved ACC merging-recognition are subsumed under the term "SRR," Furthermore, modules or units may be configured in the flow chart, within the meaning of the present disclosure, as objective components (control unit, IC component or the like) or as software components.

BRIEF DESCRIPTION OF THE DRAWINGS

The invention is explained in greater detail below with reference to expedient exemplary embodiments, wherein.

DETAILED DESCRIPTION

Figure 1:
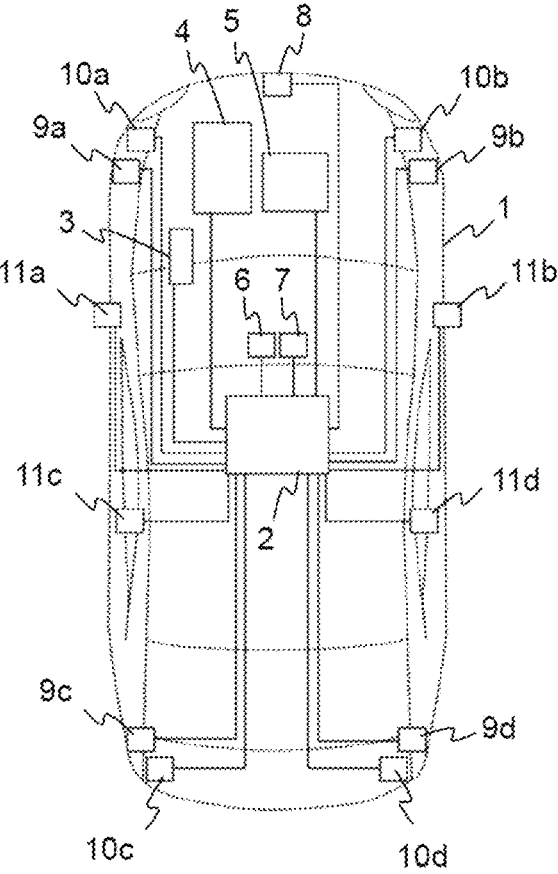
FIG. 1 shows a very simplified schematic representation of a(n) (ego-) vehicle having an assistance system according to the present disclosure.

Reference numeral 1 in FIG. 1 designates an ego-vehicle or a vehicle having various actuators (steering 3, engine 4, brake 5), which has a control device 2 (ECU, Electronic Control Unit or ADCU, Assisted and Automated Driving Control Unit), by means of which a (partially) automated control of the vehicle 1 can be effected in that the control device 2 is able to access the actuators. The vehicle 1, furthermore, has sensors for capturing the environment (front camera or camera 6, lidar sensor 7, radar sensors 8 (long-range radar sensor; LRR) or 9a-9d (short-range radar sensor; SRR), ultrasonic sensors (USS) 10a-10d as well as surround-view cameras 11a-11d), the sensor data of which are utilized for environment and object recognition so that various assistance functions such as, e.g., Park Assist, Emergency Brake Assist (EBA), Adaptive Cruise Control (ACC), lane-keeping control or Lane Keep Assist (LKA) or the like can be realized. The assistance functions are executed via the control device 2 or the algorithm saved therein. Furthermore, further subordinate control units (ECUs) may also be provided, e.g., in order to actuate the surround-view system. Furthermore, different arrangements of sensors are also captured within the framework of the present disclosure, e.g., more than four radar sensors, surround-view cameras or ultrasonic sensors can also be provided, which can be arranged anywhere on the vehicle 1.

Figure 2:
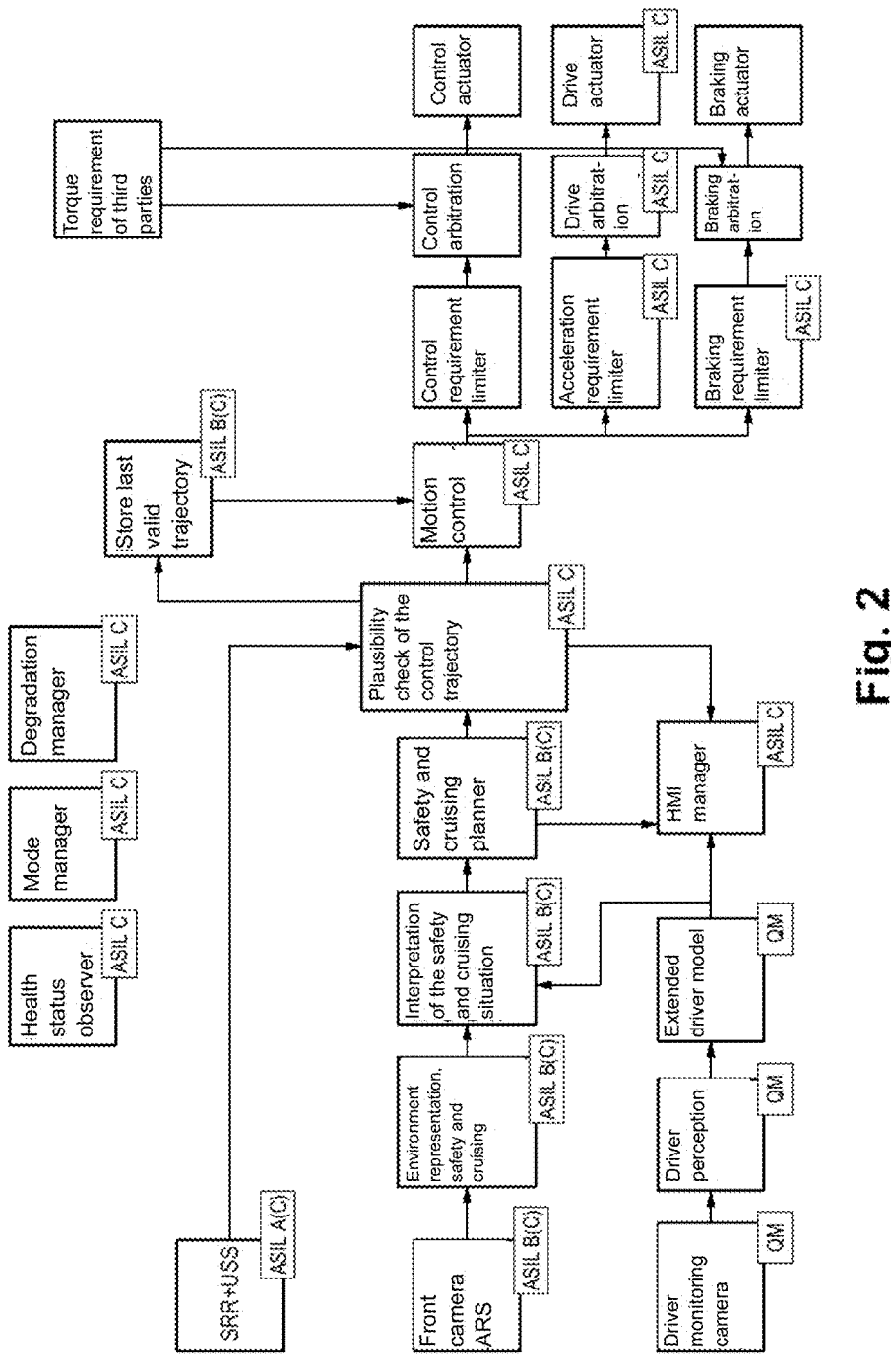
FIG. 2 shows a very simplified schematic representation of process planning of a generic method according to the prior art.
Figure 3:
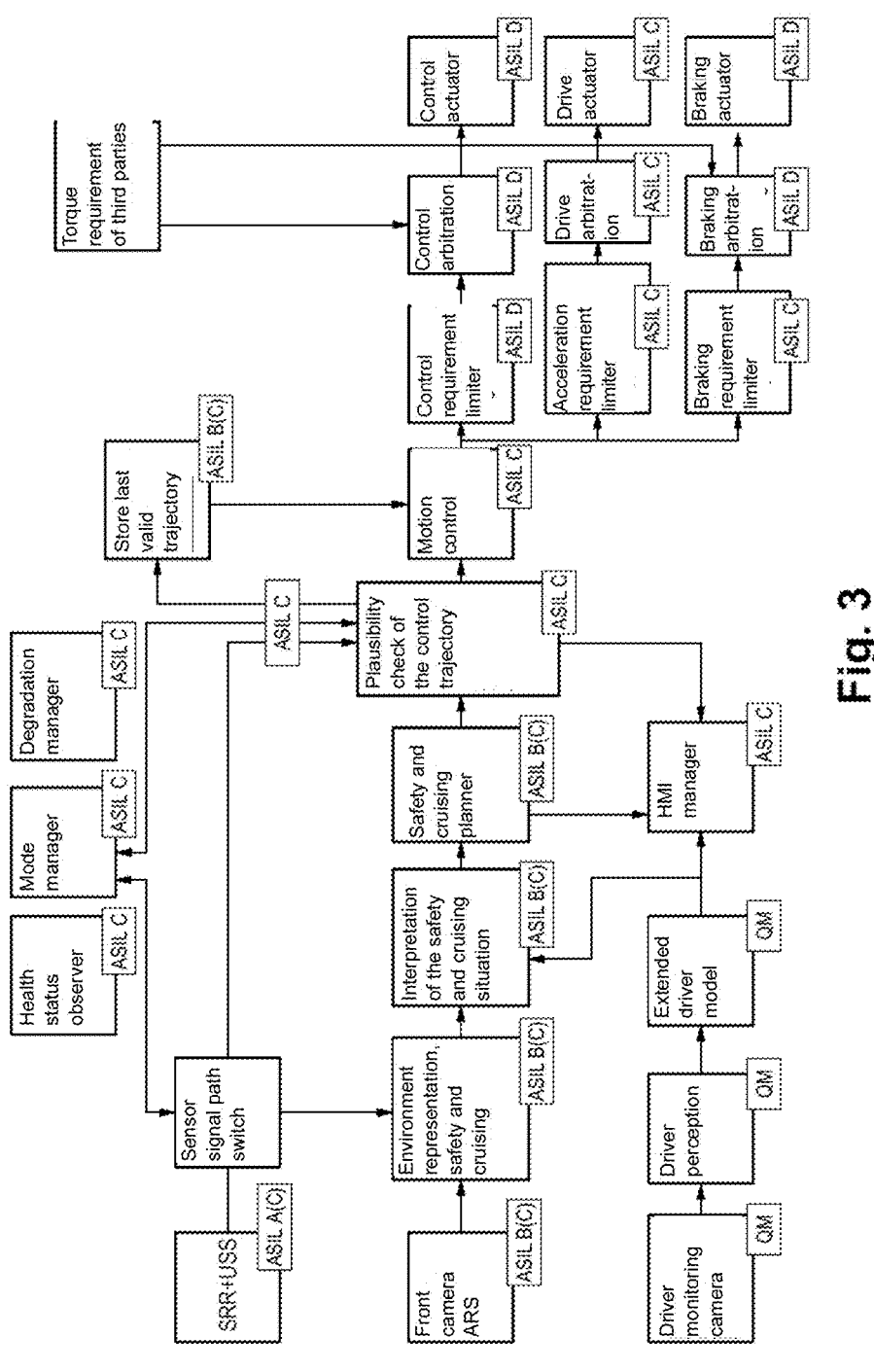
FIG. 3 shows a very simplified schematic representation of a configuration of process planning of the method according to the present disclosure.

Process planning of a generic method according to the prior art is depicted in FIG. 2. By way of contrast, FIG. 3 shows an exemplary configuration of process planning of a method according to the present disclosure.

According to the present disclosure, the mode manager and sensor signal path switch are particularly important. The mode manager recognizes the functions activated by the driver such as, for example, ACC (in particular, adaptive cruise control in stop & go), TJC (Traffic Jam Companion: hands-free driving in traffic jams, lane guidance and ACC adaptive cruise control in stop & go) or Lane Keep Assist). Furthermore, the mode manager automatically recognizes activated functions such as, e.g., Emergency Brake Assist or Lane Departure Warning System, and it recognizes the application; e.g., focus on TJC when stationary and ready to start, TJC for starting at a speed <10 km/h or TJC during operation at a speed <10 km/h. Moreover, the mode manager outputs commands which switch the second sensor set (by way of example, "SRR+ultrasonic sensors") over to the "sensor signal path switch" module.

The sensor signal path switch may switch a second sensor to the "Environment Representation Safety and Cruising" module or to the "Steering Trajectory Plausibility Checker" module, depending on the active function or recognized application.

Furthermore, the plausibility of the trajectory can be checked by way of a plausibility check by creating a redundant road model from the second sensor set (e.g., on the basis of backup objects from the ultrasonic sensors 10a-10d or the short-range radars 9a-9d in order to recognize, e.g., "swarm lanes" (of other vehicles) or the path recognized on the basis of radar data. Moreover, it is checked whether the roadway of the "Cruising and Safety Planner" module lies within the lane boundaries, which is calculated on the basis of the second sensor set. On the basis of the data, it can then be decided whether the trajectory is plausible or valid (it is then forwarded to the motion controller) or implausible or invalid (followed by: activating of the minimum risk maneuver via the mode manager and informing the driver or outputting a driver warning).

In this case, the purpose is to create a redundant "plausibility check path" for "hands-off driving" in order to guarantee safe driving for at least 3 seconds (possibly also longer: 4 seconds, 5 seconds or the like). This roughly corresponds to the takeover time from the warning until the driver can take over (hands-off mode to hands-on mode). The basic idea is to convert sensors to a redundant path only when the "hands-off driving in lane" function is active and when a specific application (e.g., driving >10 km/h and <60 km/h) exists, which also makes redundancy necessary in order to avoid the risk of physical damage. For example, such redundancy is not required in conventional ACC operation in hands-on mode, so that the second sensor set can be utilized in order to additionally feed the environment model, which is generated on the basis of data of the first sensor set, with data.

An embodiment according to the present disclosure of the method can be configured as follows:
I. Mode Manager:

Recognizing the function activated by the driver

Automatic recognition of activated functions

Checking the deactivation criteria for activated functions (e.g., brake pedal channels ACC/Cruising Companion)

Weighing up the functions (active functions)

Recognizing driver override (steering wheel, brake, accelerator pedal)

Testing whether the activation criterion is provided for the plausibility path, e.g., on the basis of If the active function is the "hands-off traffic jam companion" and the vehicle speed is greater than a lower threshold (e.g., 10 km/h) and the vehicle speed is less than an upper threshold (e.g., 60 km/h) and "hands-off operation" is recognized, the sensor signal path switch is then requested to switch over the signals of the second sensor set to the plausibility check path.

Required function deactivation/adaptation by the second sensor set

Switching over of signal to "Check the plausibility of the steering path," by way of example: deactivating the activation, avoiding side impacts (no SRR), deactivating the "ACC auto go detection" (no ultrasonic sensors), adapting the merging-recognition for ACC (no accurate recognition of merging vehicles by SRR, more conservative setting) or the like.

II. Sensor Signal Path Switch

The input from the mode manager is checked in that the data on the interface are to be indicated as "valid" when data is sent from the second sensor set (e.g., USS+SRR) to the desired destination ("check the plausibility of the trajectory" or "environmental representation, safety and cruising"). Thereafter: marking of the interface with another block (not destination) as "invalid."

III. Checking the Plausibility of the Trajectory

Enquiry whether a request from the mode manager exists. If there is a request to become active and valid data from the sensor set exist, then it is checked whether the trajectory is within the lane width of the lane width ascertained by the second sensor set. If not, the trajectories are not checked and no enquiry is sent to the mode manager.

IV. Environment Representation Safety and Cruising

Check of whether data from the second sensor set is valid or not and, possibly, use of the data in the sensor fusion (of the first sensor set).

Figure 4:
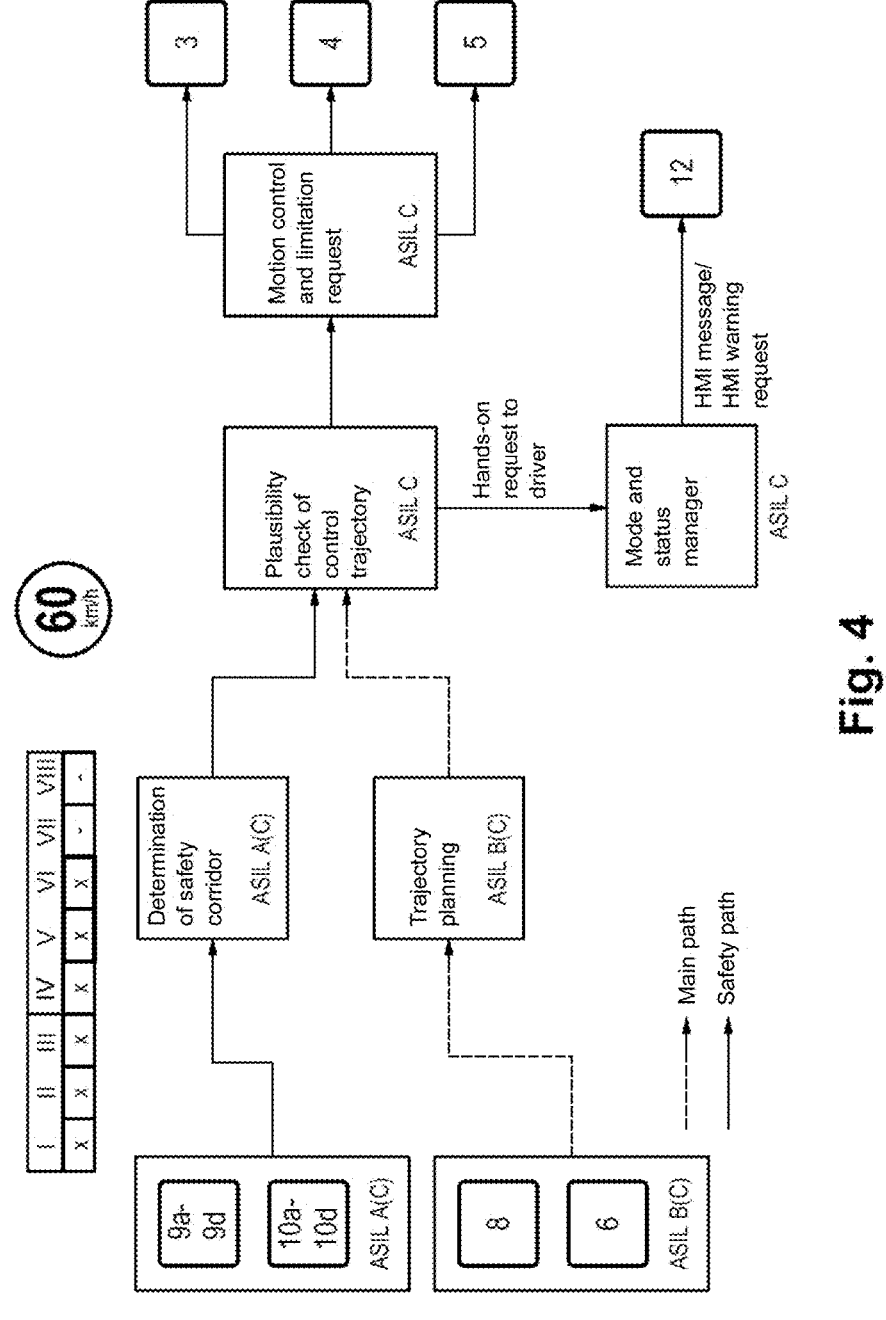
FIG. 4 shows a very simplified schematic representation of a configuration of a flow chart in accordance with the method according to the present disclosure in a "hands-off" situation at 60 km/h.

FIG. 4 shows a configuration or architecture of the method according to the present disclosure: the hands-off concept is based on the plausibility check of the planned ego-trajectory against the roadway recognition of the radar sensors 9a-9d with optional ultrasonic detection via 10a-10d at up to 60 km/h. In this case, SRR 9a-9d as well as ultrasonic detectors 10a-10d are assigned to the second sensor set, and radar sensor 8 and camera 6 (as well as, possibly, lidar 7; not shown in FIG. 4) are assigned to the first sensor set. In the event of malfunctions of the system, the last valid steering request is kept constant or the trajectory last driven or stored in the system is continued, the vehicle is decelerated and the driver is asked to take over.

Figure 5:
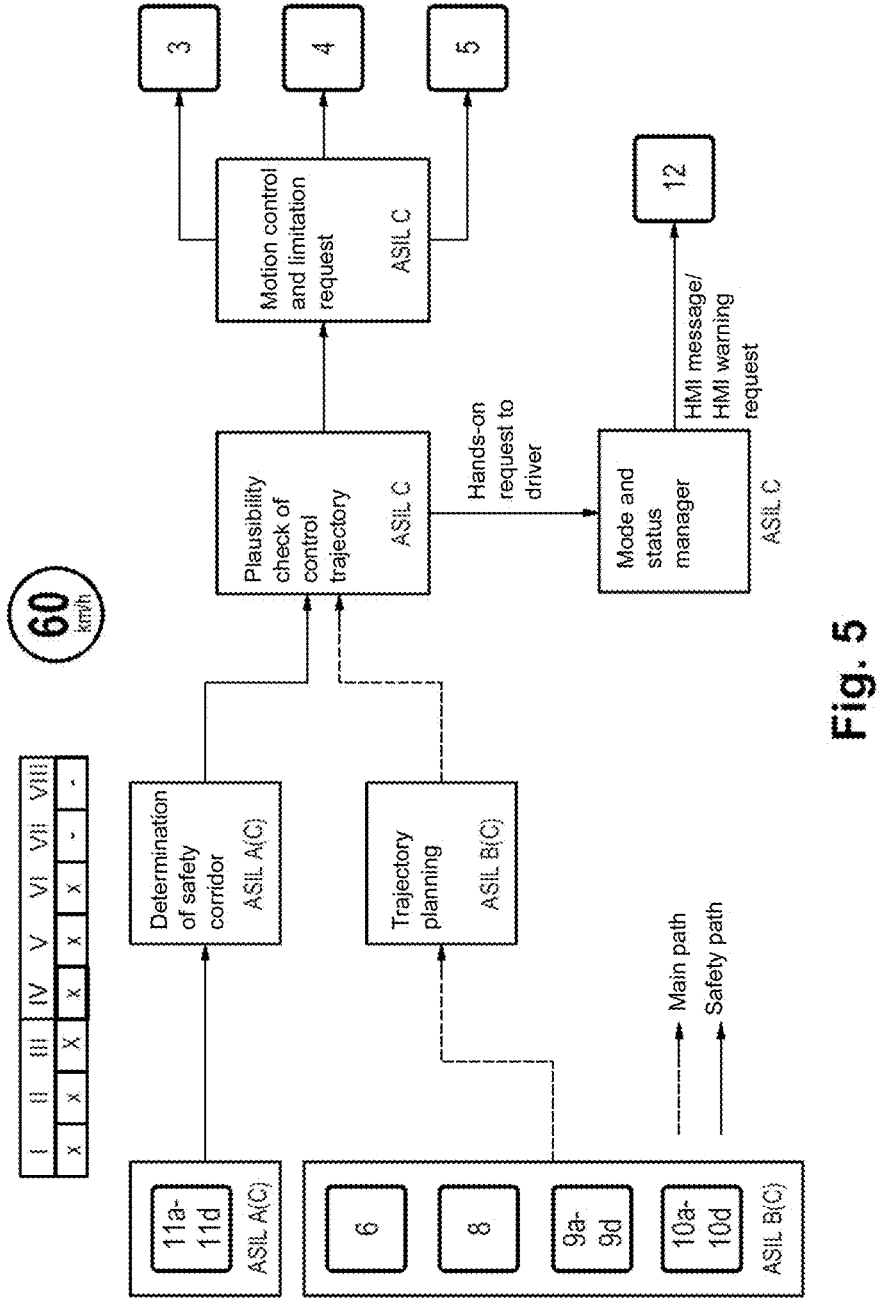
FIG. 5 shows a very simplified schematic representation of a further configuration of a flow chart in accordance with the method according to the present disclosure in a "hands-off" situation at 60 km/h.

FIG. 5 shows a configuration or architecture of the method according to the present disclosure: the hands-off concept is based on the plausibility check of the planned ego-trajectory against the traffic lane recognition of the surround-view cameras at up to 60 km/h. In this case, the SV cameras 11a-11d are assigned to the second sensor set, and radar sensor 8, radar sensors 9a-9d, ultrasonic sensors 10a-10d and camera 6 (as well as, possibly, lidar 7; not shown in FIG. 4) are assigned to the first sensor set. In the event of malfunctions of the system, the last valid steering request is kept constant or the trajectory last driven or stored in the system is continued, the vehicle is decelerated and the driver is asked to take over.

Figure 6:
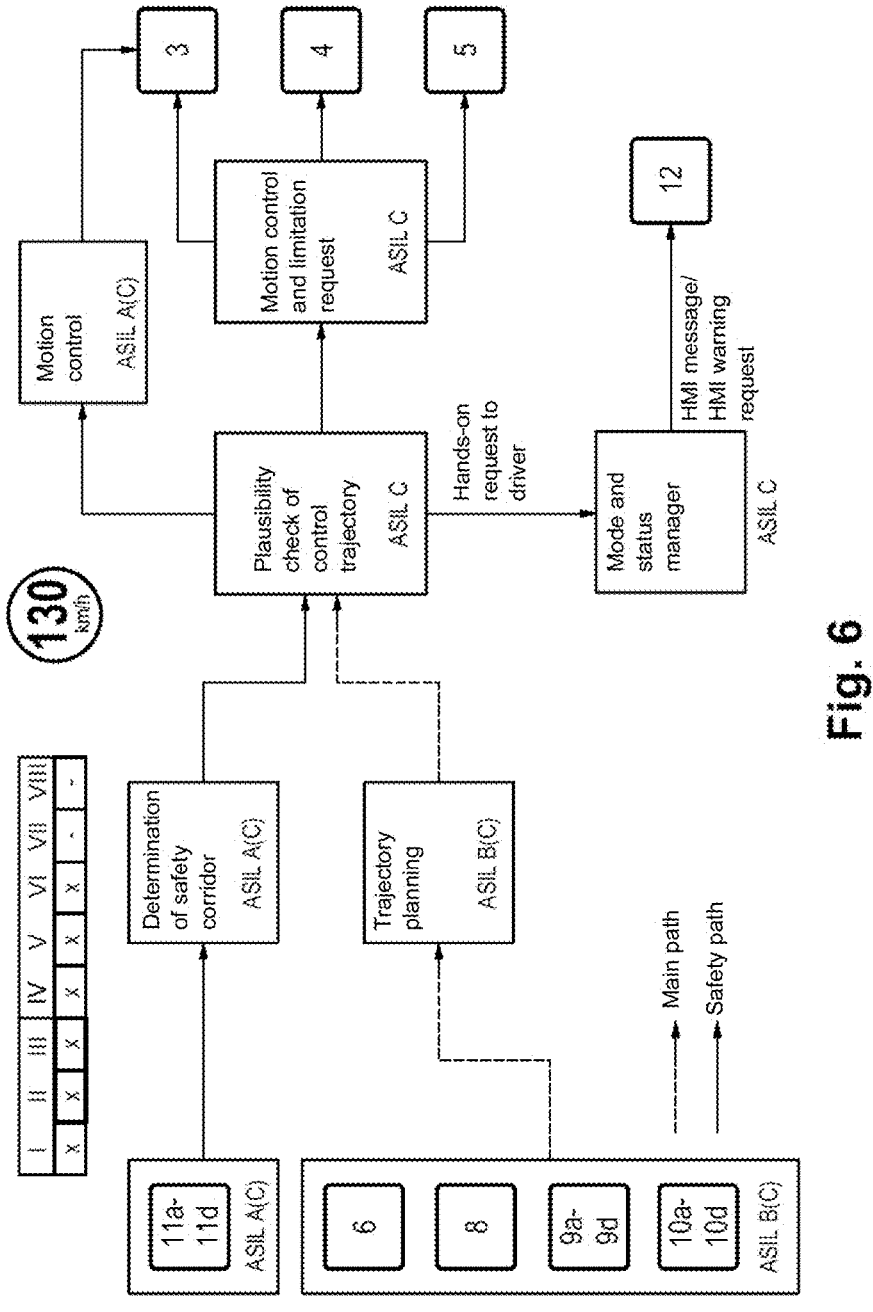
FIG. 6 shows a very simplified schematic representation of a further configuration of a flow chart in accordance with the method according to the present disclosure in a "hands-off" situation at 130 km/h.

FIG. 6 shows a configuration or architecture of the method according to the present disclosure: the hands-off concept is based on the plausibility check of the planned ego-trajectory against the traffic lane recognition of the surround-view cameras at up to 130 km/h. In this case, the SV cameras 11a-11d are assigned to the second sensor set, and radar sensor 8, radar sensors 9a-9d, ultrasonic sensors 10a-10d and camera 6 (as well as, possibly, lidar 7; not shown in FIG. 4) are assigned to the first sensor set. In the event of malfunctions of the system, the last valid steering request is kept constant or the trajectory last driven or stored in the system is continued, the vehicle is decelerated and the driver is asked to take over. Such a configuration guarantees greater safety for higher speeds.

Figure 7:
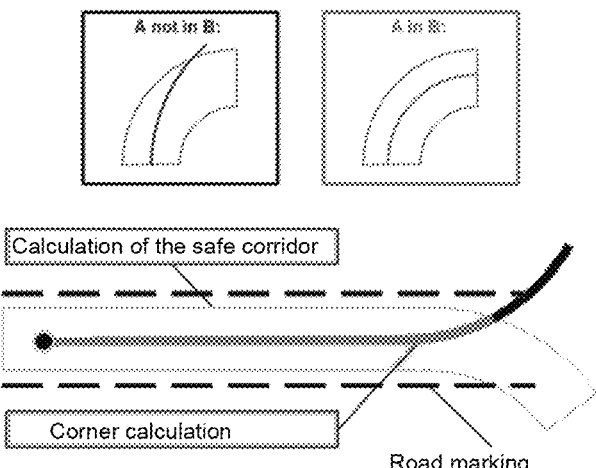
FIG. 7 shows a very simplified overview of a plausibility test.

FIG. 7 shows a configuration of a plausibility test. With a forward-looking plausibility check of the ego-lane, it is possible to transition to manual driving at an early stage. The plausibility range can be selected in such a way that the driver is given a predefined reaction time before an error recognition (e.g., incorrect lane recognition) or an incorrect steering maneuver due to an electric/electronic failure leads to a departure from the lane. If the input data used for the plausibility check are not compatible with one another, an escalation concept can be initiated with sufficient lead time and, if the driver does not react, the system can be brought into a safe state. Measures including an additional system reaction e.g., a delay in order to extend the granted response time can, in addition, be initiated as well in the event of a failed plausibility check.

LIST OF REFERENCE NUMERALS

1 Vehicle
2 Control device

3 Steering
4 Engine
5 Brake
6 Front camera
7 Lidar sensor
8 Radar sensor (long-range radar; LRR)
9a-9d Radar sensor (short-range radar; SRR)
10a-10d Ultrasonic sensor (USS)
11a-11d Surround-view camera (SVC)
12 Human Machine Interface (HMI)

The invention claimed is:

1. A method for operating an assistance system for a vehicle, comprising
controlling the assistance system by a control device comprising a processor or electronic control unit,
capturing the environment by multiple sensors, wherein
a first sensor set which comprises at least one sensor of the sensors for capturing the environment, and
a second sensor set which comprises at least one sensor of the sensors for capturing the environment, wherein
enlisting sensor signals of the first sensor set in order to create an environmental model,
carrying out at least one of trajectory planning or driving functions of the assistance system on the basis of the environmental model, and
routing, by a sensor signal path switch, sensor signals of the second sensor set either via a main path to signal processing of the environmental model or via a safety path to the signal processing of a plausibility check of the planned trajectory,
providing a mode manager which is configured to recognize assistance functions and assistance functions to be automatically activated, and to establish a necessity of whether the safety path is required or not on the basis of the recognized assistance functions.

2. The method according to claim 1, wherein the sensor signal path switch switches the sensor signals on the basis of establishment of the mode manager.

3. A method for operating an assistance system for a vehicle according to claim 1, the method comprising:
determining the assistance functions to be carried out,
determining the assistance functions to be automatically activated,
establishing a necessity of constructing a safety path for the activated functions,
switching off the signals of the sensors of the safety path for the main path of the system if the safety path is necessary,
activating the safety path in order to check outputs of the main path of the system if the safety path is necessary, and
deactivating the assistance functions which are not possible without the sensors of the safety path.

4. The method according to claim 3, wherein the necessity of constructing the safety path for the activated functions is established on the basis of the activated function of a current vehicle state.

5. The method according to claim 3, wherein the necessity of constructing the safety path for the activated functions is established on the basis of a driver state.

6. The method according to claim 1, wherein the safety path is used in order to check a plausibility of an output trajectory of the main path, which is to be driven, against an alternative road model of the safety path.

7. The method according to claim 1, wherein the safety path is used in order to bring about a driver handover and a minimum-risk state in the event of a trajectory of the main path is implausible.

8. An assistance system which is operated by a method according to claim 1, comprising:

the control device for controlling the assistance system, the multiple sensors for capturing the environment, wherein the first sensor set which comprises the at least one sensor of the sensors for capturing the environment, and the second sensor set which comprises the at least one sensor of the sensors for capturing the environment, wherein the sensor signals of the first sensor set are enlisted in order to create the environmental model, the at least one of the trajectory planning or the driving functions of the assistance system us carried out on the basis of the environmental model, and the sensor signal path switch, which switches the sensor signals of the second sensor set either via the main path to the signal processing of the environmental model or via the safety path to the signal processing of the plausibility check of the planned trajectory.

9. A method for operating an assistance system for a vehicle, comprising controlling the assistance system by a control device comprising a processor or electronic control unit, capturing the environment by multiple sensors, wherein a first sensor set which comprises at least one sensor of the sensors for capturing the environment, and a second sensor set which comprises at least one sensor of the sensors for capturing the environment, wherein enlisting sensor signals of the first sensor set in order to create an environmental model, carrying out at least one of trajectory planning or driving functions of the assistance system on the basis of the environmental model, and routing, by a sensor signal path switch, sensor signals of the second sensor set either via a main path to signal processing of the environmental model or via a safety path to the signal processing of a plausibility check of the planned trajectory, wherein a road model of the safety path is created on the basis of detected lane markings of a redundant camera.

\* \* \* \* \*